United States Patent [19]

Nakamura et al.

US005431850A

[11] Patent Number: 5,431,850
[45] Date of Patent: Jul. 11, 1995

[54] NEMATIC LIQUID-CRYSTAL COMPOSITION FOR ACTIVE MATRIX APPLICATION

[75] Inventors: Masako Nakamura, Yamatokooriyama; Kei Sasaki, Sakura; Shuichi Kohzaki, Nara; Fumiaki Funada, Yamatokooriyama; Hiroshi Numata, Yokohama; Hideo Ichinose, Odawara, all of Japan; Herbert Plach, Darmstadt; Eike Poetsch, Mühltal, both of Germany

[73] Assignees: Merck Patent Gesellschaft mit Beschrankter Haftung, Darmstadt, Germany; Sharp Corporation, Osaka, Japan

[21] Appl. No.: 286,956

[22] Filed: Aug. 8, 1994

[30] Foreign Application Priority Data

Aug. 9, 1993 [EP] European Pat. Off. ............ 93112742
Aug. 9, 1993 [EP] European Pat. Off. ............ 93112743

[51] Int. Cl.$^6$ ..................... C09K 19/30; C09K 19/12; G02F 1/13
[52] U.S. Cl. ..................... 252/299.63; 252/299.66; 359/103
[58] Field of Search ..................... 252/299.63, 299.66; 359/103

[56] References Cited

U.S. PATENT DOCUMENTS

| | | | |
|---|---|---|---|
| 5,064,567 | 11/1991 | Funada et al. | 252/299.61 |
| 5,279,763 | 1/1994 | Sasaki et al. | 252/299.63 |
| 5,286,411 | 2/1994 | Rieger et al. | 252/299.63 |
| 5,308,543 | 5/1994 | Sasaki et al. | 252/299.63 |
| 5,330,679 | 7/1994 | Sasaki et al. | 252/299.63 |
| 5,350,535 | 9/1994 | Rieger et al. | 252/299.63 |
| 5,368,772 | 11/1994 | Rieger et al. | 252/299.63 |

FOREIGN PATENT DOCUMENTS

| | | |
|---|---|---|
| 0502407 | 9/1992 | European Pat. Off. . |
| 0502406 | 12/1992 | European Pat. Off. . |
| 4139553 | 6/1992 | Germany . |
| 4218613 | 12/1993 | Germany . |
| 5039481 | 2/1993 | Japan . |
| 5255667 | 10/1993 | Japan . |
| 92014800 | 9/1992 | WIPO . |
| 9403558 | 2/1994 | WIPO . |

Primary Examiner—Cynthia Harris
Attorney, Agent, or Firm—Millen, White, Zelano & Branigan

[57] ABSTRACT

The invention relates to a nematic liquid-crystal composition for active matrix displays with high voltage holding ratio and extremely good low temperature stability.

20 Claims, No Drawings

NEMATIC LIQUID-CRYSTAL COMPOSITION FOR ACTIVE MATRIX APPLICATION

SUMMARY OF THE INVENTION

The invention relates to a nematic liquid-crystal composition based on terminally and laterally fluorinated compounds. This composition is especially useful for active matrix application.

Active matrix displays (AMD) are highly favored for commercially interesting displays with a high information content. Such AMDs are used for TV application and also for displays with high information content for computer terminals, automobiles and aeroplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) [Niwa, K., et al., 1984, SID 84, Digest, pp. 304–307] can be applied. These non-linear driving elements allow the use of an electro-optical effect with a rather flat electro-optical characteristic if a good viewing angle characteristic can be obtained. So a TN-type LC cell [Schadt, M. and Helfrich, W., 1971, Appl. Phys. Lett., 18, 127] with a twist angle of 90° can be used. To provide the good contrast over a wide viewing angle, operation in the first minimum of transmission [Pohl, L., Eidenschink, R., Pino, F. del., and Weber, G., 1980, German Pat., DBP 30 22 818, and 1981, U.S. Pat. No. 4,398,803; Pohl, L., Weber, G., Eidenschink, R., Baur, G., and Fehrenbach, W., 1981, Appl. Phys. Lett., 38, 497; Weber, G., Finkenzeller, U., Geelhaar, T., Plach, H. J., Rieger, B., and Pohl, L., 1988, Int. Symp. on Liq. Cryst., Freiburg, to be published in Liq. Crys.] is required. These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Kajima, E., Watanabe, H., Shimuzu, H., Proc. Eurodisplay 84, September 1984: A 210-288 Matrix LCD Controlled by Double Stage Diode Rings, p. 144 ff, Paris; Stromer, M., Proc. Eurodisplay 84, September 1984: Design of Thin Film Transistors for Matrix Addressing of Television Liquid Crystal Displays, p. 145 if, Paris].

In an AMD the non-linear switching elements are addressed in a multiplex scheme. So they charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. They are the capacity of the electrodes of the pixel and resistivity of the dielectric material between the electrodes, namely the liquid crystal. The characteristic time constant of the decay of the voltage at a pixel (RC-time) has to be significantly bigger than the time between two adressing cycles (tadr.). A parameter frequently used to describe the performance of an AMD is the voltage holding ratio HR of a picture element:

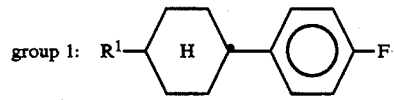

As the voltage at a pixel decays exponentially an increase of the holding ratio necessitates liquid crystal materials with exceptionally high resistivities.

There are several points of importance for the resistivity of the liquid crystal inside a display, e.g., orientation layers, curing condition of the orientation material. But, by no means less important are the electrical properties of the liquid crystal used. Especially the resistivity of the liquid crystal in the display determines the magnitude of the voltage drop at the pixel.

There is thus still a great need for liquid-crystal composition having a high resistivity and other suitable material properties for use in AMDs such as a broad nematic mesophase range with an extremely low transition temperature smectic-nematic, no crystallization at low temperatures and a particularly low threshold voltage.

An object of the invention is to provide a liquid-crystal composition with a very high resistivity which meets also the other demands.

Upon further study of the specification and appended claims, further objects and advantages of this invention will become apparent to those skilled in the art.

It has now been found that a nematic liquid-crystal composition consisting of terminally and laterally fluorinated compounds from the following groups 1 to 5:

group 1: 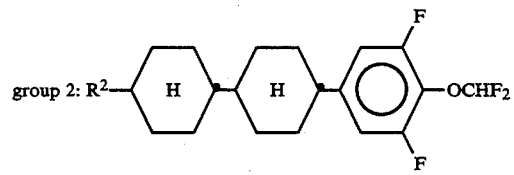

wherein $R^1$ denotes a straight-chain alkyl group of 5 or more carbon atoms, e.g., 5–7 carbon atoms, group 2:

wherein $R^2$ denotes a straight-chain alkyl group of 2 to 5 carbon atoms, group 3: 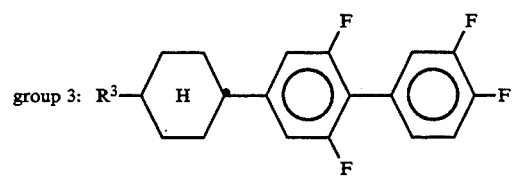

wherein $R^3$ denotes a straight-chain alkyl group of 2 to 5 carbon atoms, group 4: 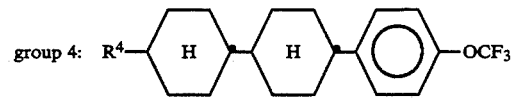

wherein R⁴ denotes a straight-chain alkyl group of 2 to 5 carbon atoms,

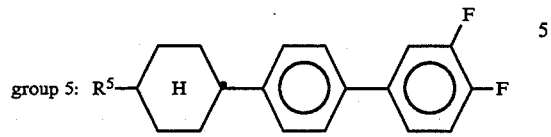

wherein R⁵ denotes a straight-chain alkyl group of 2 to 5 carbon atoms,
and optionally also from group 6:

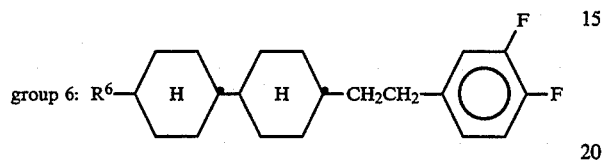

wherein R⁶ denotes a straight-chain alkyl group of 3 to 5 carbon atoms, characterized in that it contains about 2 to 10% by weight of at least one compound from group 1, about 55 to 75% by weight of at least three compounds from group 2, about 15 to 25% by weight of at least three compounds from group 3, about 2 to 10 by weight of at least one compound from group 4 and about 2 to 10% by weight of at least one compound from group 5 or about 10 to 20% by weight of at least one compound from group 1, about 20 to 30% by weight of at least two compounds from group 2, about 5 to 15% by weight of at least two compounds from group 3, about 20 to 30% by weight of four compounds from group 4, about 5 to 15% by weight of at least two compounds from group 5 and about 15 to 25% by weight of at least two compounds from group 6, is highly suited for AMD application. High RC time values can be obtained in AMDs. These compositions also show an extremely broad nematic mesophase range, an extremely low viscosity at deep temperatures (which allows short switching times at low temperatures), a low birefringence which result in a good contrast over a wide viewing angle and a low threshold voltage and/or do not exhibit any crystallization at −30° C.

Preferred compositions contain 10 to 20% by weight of at least one compound from group 1:

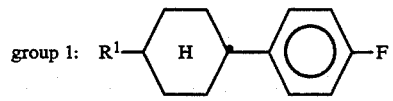

wherein R¹ denotes a straight-chain alkyl group of 5 to 7 carbon atoms, about 20 to 30% by weight of at least two compounds from group 2:

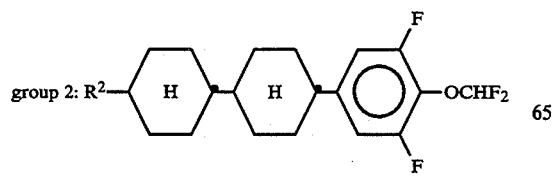

wherein R² denotes a straight-chain alkyl group of 3 to 5 carbon atoms, about 5 to 15% by weight of at least two compounds from group 3:

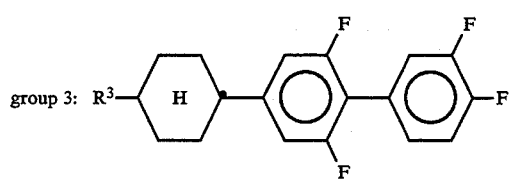

wherein R³ denotes a straight-chain alkyl group of 3 to 5 carbon atoms, about 20 to 30% by weight of at least two compounds from group 4:

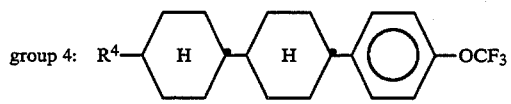

wherein R⁴ denotes a straight-chain alkyl group of 2 to 5 carbon atoms, about 5 to 15% by weight of at least two compounds from group 5:

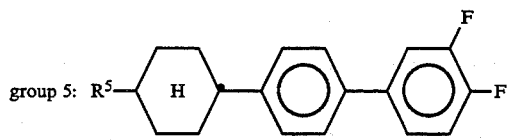

wherein R⁵ denotes a straight-chain alkyl group of 3 to 5 carbon atoms, about 15 to 25% by weight of at least two compounds from group 6:

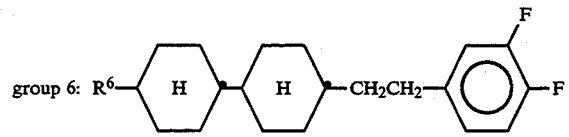

wherein R⁶ denotes a straight-chain alkyl group of 3 to 5 carbon atoms.

Such compositions preferably contain one compound from group 1, wherein R¹ is heptyl. Preferred compositions comprise 26% by weight or more of two or more compounds from group 2.

The compounds from groups 1 to 6 are known from the European Patent Applns. 0 387 032 and 0 280 902, the European Patents 0 051 738 and 0 125 653, the International Patent Applications WO 89/02884, WO 85/04874, WO 89/02884, WO 91/03450, WO 91/08184, the German Patents DE 29 07 332 and DE 30 42 391 and U.S. Pat. Nos. 4,302,352, 4,710,315 and 4,419,264 or can be prepared in analogy to known compounds.

The compositions according to this invention preferably comprise 12 to 15% by weight of components from group 1. The preferred weight percent ranges for the other groups are as follows:

group 2: 25 to 30%
group 3: 8 to 12%
group 4: 22 to 25%
group 5: 6 to 10%
group 6: 16 to 20%

Another preferred composition contains about 2 to 10% by weight of at least one compound from group 1:

group 1: 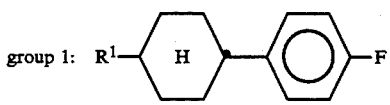

wherein R¹ denotes a straight-chain alkyl group of 5 to 7 carbon atoms, about 55 to 75% by weight of at least three compounds from group 2:

group 2: 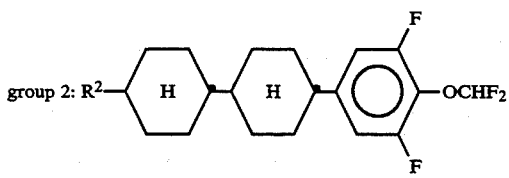

wherein R² denotes a straight-chain alkyl group of 2 to 5 carbon atoms, about 15 to 25% by weight of at least three compounds from group 3:

group 3: 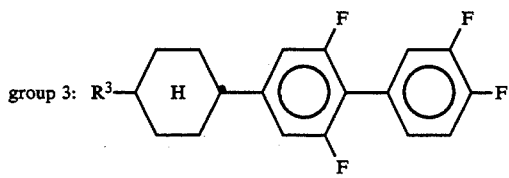

wherein R³ denotes a straight-chain alkyl group of 2 to 5 carbon atoms, about 2 to 10% by weight of at least one compound from group 4:

group 4: 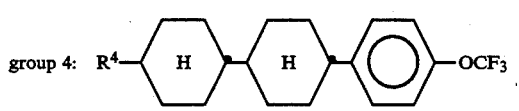

wherein R⁴ denotes a straight-chain alkyl group of 3 to 5 carbon atoms, about 2 to 10% by weight of at least one compound from group 5:

group 5: 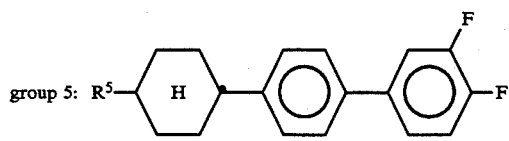

wherein R⁵ denotes a straight-chain alkyl group of 2 to 5 carbon atoms.

Such compositions preferably contain three compounds from group 2. Preferred compositions comprise 65% by weight or more of three compounds from group 2.

The compositions according to this invention preferably comprise 18 to 22% by weight of components from group 3. The preferred weight percent ranges for the other groups are as follows:
group 1: 3 to 8%
group 4: 3 to 8%
group 5: 3 to 8%

The preparation of the compositions according to the invention is effected in the conventional manner. In general, the desired amount of the components which is used in the small amount is dissolved in the components which constitutes the main constituent, preferably at elevated temperature. If this temperature is chosen to be above the clearing point of the main constituent, the completeness of the process of dissolving can be observed particularly easily.

However, it is also possible to mix solutions of the components in a suitable organic solvent, for example, acetone, chloroform or methanol, and to remove the solvent after thorough mixing, for example by distillation under reduced pressure. It is serf-evident that with this method it must be ensured that the solvent does not introduce any contaminants or undesirable dopants. By means of suitable additives the liquid crystal phases according to the invention can be modified in such a way that they can be used in any hitherto disclosed kind of AMD.

The examples below serve to illustrate the invention without limiting it. In the examples, the clearing points of a liquid crystal mixture are given in degrees Celsius. The percentages are by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, and of corresponding European application Nos. EP 93112743.5, filed Aug. 9, 1993, and EP 93112742.7, filed Aug. 9, 1993, are hereby incorporated by reference.

EXAMPLES

Example 1

A liquid-crystal composition consisting of
14% of trans-1-p-fluorophenyl-4-n-heptylcyclohexane
6% of p-[trans-4-(trans-4-ethylcyclohexyl)-cyclohexyl]-trifluoromethoxybenzene
6% of p-[trans-4-(trans-4-propylcyclohexyl)-cyclohexyl]-trifluoromethoxybenzene
6% of p-[trans-4-(trans-4-n-butylcyclohexyl)-cyclohexyl]-trifluoromethoxybenzene
6% of p-[trans-4-(trans-4-n-pentylcyclohexyl)-cyclohexyl]-trifluoromethoxybenzene
9% of 1-[trans-4-(trans-n-propylcyclohexyl)-cyclohexyl]-2-(3,4-difluorophenyl)-ethane,
9% of 1-[trans-4-(trans-n-pentylcyclohexyl)-cyclohexyl]-2-(3,4-difluorophenyl)-ethane,
4% of 4'-(trans-4-n-propylcyclohexyl)-3,4-difluorobiphenyl,
4% of 4'-(trans-4-n-pentylcyclohexyl)-3,4-difluorobiphenyl,
5% of 4'-(trans-4-n-propylcyclohexyl)-3,4,2',6'-tetrafluorobiphenyl,
5% of 4'-(trans-4-n-pentylcyclohexyl)-3,4,2',6'-tetrafluorobiphenyl,
13% of 1-[trans-4-(trans-4-n-propylcyclohexyl)-cyclohexyl]-3,5-difluoro-4-difluoromethoxybenzene, and
13% of 1-[trans-4-(trans-4-n-pentylcyclohexyl)-cyclohexyl]-3,5-difluoro-4-difluoromethoxybenzene
is prepared. Physical parameters are given in the following ruble.

| S/N | < −40° C. |
|---|---|
| Clearing point | 88° C. |
| Δn (20° C., 589 nm) | 0.0877 |

| | |
|---|---|
| $V_{10,0,20}$ | 1.71 V |
| Viscosity at 20° (−40) | 20 (3600) mPa·s |

Example 2

A liquid-crystal composition consisting of
5% of trans-1-p-fluorophenyl-4-n-pentylcyclohexane,
5% of p-[trans-4-(trans-4-n-pentylcyclohexyl)-cyclohexyl-trifluoromethoxybenzene,
5% of 4'-(trans-4-ethylcyclohexyl)-3,4-difluorobiphenyl,
6% of 4'-(trans-4-ethylcyclohexyl)-3,4,2',6'-tetrafluorobiphenyl,
7% of 4'-(trans-4-propylcyclohexyl)-3,4,2',6'-tetrafluorobiphenyl,
7% of 4'-(trans-4-pentylcyclohexyl)-3,4,2',6'-tetrafluorobiphenyl,
25% of 1-[trans-4-(trans-4-ethylcyclohexyl)-cyclohexyl]-3,5-difluoro-4-difluoromethoxybenzene,
20% of 1-[trans-4-(trans-4-propylcyclohexyl)-cyclohexyl]-3,5-difluoro-4-difluoromethoxybenzene,
20% of 1-[trans-4-(trans-4-pentylcyclohexyl)-cyclohexyl]-3,5-difluoro-4-difluoromethoxybenzene,
is prepared. Physical parameters are given in the following table.

| | |
|---|---|
| S→N (°C.) | <−40 |
| Clearing point (°C.) | +75 |
| Viscosity (mm$^2$·s$^{-1}$) at 20 °C. | 34 |
| Δn(20° C., 589 nm) | 0.0909 |
| Δε(1 kHz, 20° C.) | +9.7 |
| $V_{10,0,20}$ (Volt) | 1.28 |
| $V_{90,0,20}$ (Volt) | 1.92 |
| K, (10$^{-12}$ N) at 20 C. | 9.9 |
| K2 (10$^{-12}$ N) at 20 C. | 4.6 |
| K3 (10$^{-12}$ N) at 20 C. | 13.5 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nematic liquid-crystal composition consisting essentially of: terminally and laterally fluorinated compounds from groups 1 to 5:

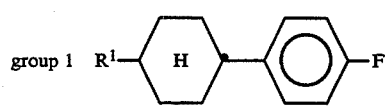

wherein $R^1$ is a straight-chain alkyl of 5 or more carbon atoms;

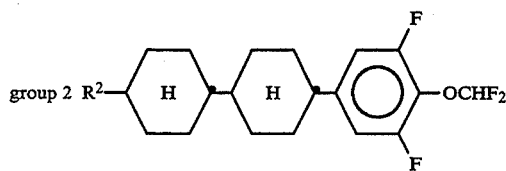

wherein $R^2$ is straight-chain alkyl of 2 to 5 carbon atoms;

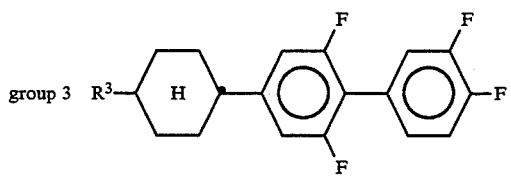

wherein $R^3$ is straight-chain alkyl of 2 to 5 carbon atoms;

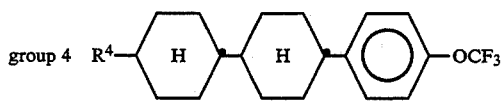

wherein $R^4$ is straight-chain alkyl of 2 to 5 carbon atoms;

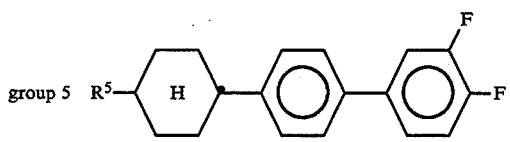

wherein $R^5$ is straight-chain alkyl of 2 to 5 carbon atoms;
and, optionally, further comprising terminally and laterally fluorinated compounds from group 6:

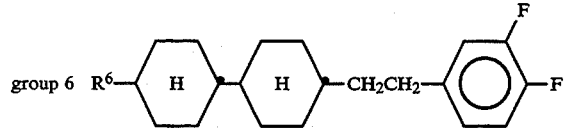

wherein $R^6$ is straight-chain alkyl of 3 to 5 carbon atoms,
wherein said composition contains:
 2-10% by weight of at least one compound from group 1;
 55-75% by weight of at least three compounds from group 2;
 15-25% by weight of at least three compounds from group 3;
 2-10% by weight of at least one compound from group 4; and
 2-10% by weight of at least one compound from group 5; or
said composition contains:
 10-20% by weight of at least one compound from group 1;
 20-30% by weight of at least two compounds from group 2;

5–15% by weight of at least two compounds from group 3;
20–30% by weight of four compounds from group 4;
5–15% by weight of at least two compounds from group 5; and
15–25% by weight of at least two compounds from group 6.

2. A composition according to claim 1, wherein said composition contains 2–10 wt. % of at least one compound from group 1, 55–75 wt. % of at least three compounds from group 2, 5–25 wt. % of at least three compounds from group 3, 2–10 wt. % of at least one compound from group 4, and 2–10 wt. % of at least one compound from group 5.

3. A composition according to claim 1, wherein said composition contains 10–20 wt. % of at least one compound from group 1, 20–30 wt. % of at least two compounds from group 2, 5–15 wt. % of at least two compounds from group 3, 20–30 wt. % of four compounds from group 4, 5–15 wt. % of at least two compounds from group 5, and 15–25 wt. % of at least two compounds from group 6.

4. A composition according to claim 1, wherein $R^1$ is a straight-chain alkyl group of 5–7 C atoms.

5. A composition according to claim 2, wherein $R^1$ is a straight-chain alkyl group of 5–7 C atoms.

6. A composition according to claim 3, wherein $R^1$ is a straight-chain alkyl group of 5–7 C atoms.

7. A composition according to claim 2, wherein said composition contains 65–75 wt. % of three compounds from group 2.

8. A composition according to claim 2, wherein said composition contains 18–22 wt. % of at least three compounds from group 3.

9. A compound according to claim 2, wherein said composition contains 3–8 wt. % of at least one compound from group 1.

10. A composition according to claim 2, wherein said composition contains 3–8 wt. % of at least one compound from group 4.

11. A composition according to claim 2, wherein said composition contains 3–8 wt. % of at least one compound from group 5.

12. A composition according to claim 3, wherein said composition contains at least one compound from group 1, wherein $R^1$ is heptyl.

13. A composition according to claim 3, wherein said composition contains 12–15 wt. % of at least one compound from group 1.

14. A composition according to claim 3, wherein said composition contains 25–30 wt. % of at least two compounds from group 2.

15. A composition according to claim 3, wherein said composition contains 26–30 wt. % of at least two compounds from group 2.

16. A composition according to claim 3, wherein said composition contains 8–12 wt. % of at least two compounds from Group 3.

17. A composition according to claim 3, wherein said composition contains 22–25 wt. % of four compounds from group 4.

18. A composition according to claim 3, wherein said composition contains 6–10 wt. % of at least two compounds from group 5.

19. A composition according to claim 3, wherein said composition contains 16–20 wt. % of at least two compounds from group 6.

20. In an active matrix display containing a liquid crystal phase, the improvement wherein said liquid crystal phase is a nematic liquid crystal composition according to claim 1.

* * * * *